April 5, 1927.

J. L. TUFTS 1,623,508

PROCESS FOR THE SEPARATION OF LIQUID MIXTURES AND DEVICE SUITABLE THEREFOR

Filed April 25, 1923      3 Sheets-Sheet 1

Inventor
John L. Tufts
By his Attorney

April 5, 1927.　　　　　　　　　　　　　　　1,623,508
J. L. TUFTS
PROCESS FOR THE SEPARATION OF LIQUID MIXTURES AND DEVICE
SUITABLE THEREFOR
Filed April 25, 1923　　　3 Sheets-Sheet 2

Inventor
John L. Tufts
By his attorney

April 5, 1927.

J. L. TUFTS 1,623,508

PROCESS FOR THE SEPARATION OF LIQUID MIXTURES AND DEVICE SUITABLE THEREFOR

Filed April 25, 1923

Patented Apr. 5, 1927.

1,623,508

UNITED STATES PATENT OFFICE.

JOHN L. TUFTS, OF WESTBORO, MASSACHUSETTS.

PROCESS FOR THE SEPARATION OF LIQUID MIXTURES AND DEVICE SUITABLE THEREFOR.

Application filed April 25, 1923. Serial No. 634,508.

My invention relates to processes and devices adapted for the separation of mixtures of liquids, emulsions and solids, any or all of them, into their component specific gravity portions and refers particularly to processes and devices adapted for the separation of such mixtures containing grease, grease emulsions, liquid dissolved solids and undissolved solids.

While my process and devices are adapted for the general separations, as mentioned above, they are particularly valuable in the treatment of the products resulting from the ordinary cleansing and washing processes of wool treatment and, while I will describe my process and devices as directed to the last-mentioned mixtures, I do not intend that my invention shall be limited to this particular object.

The mixture resulting from the cleansing and washing of wool consists of a large number of products, among the more important of which are grease, grease emulsion, liquid solutions of soluble materials natural to the wool and added for purposes of treatment and suspended and depositing solids.

The greater portion of these may be made valuable either as commercial products or for purposes of reuse, and hence, the separation of the mixture into its component parts is most advantageous and adds a further economic value process.

Of the general classification of products mentioned above, the grease has a high commercial value, the dissolved materials consisting chiefly of potassium salts organic acids with alkaline carbonates can be further reused in solution form until too largely contaminated with detrimental impurities when they may be recovered from the solution in various ways giving final products of commercial or further reuse value, and the solids having possible other value.

The process and devices of my invention accomplish all of the desirable results in an effective and economical manner, and hence, possess great value and utility.

Mixtures as described above may be generally classified according to their specific gravities into grease, grease emulsion, liquid solutions and solids.

Preliminary specific gravity partial separation of suspended matters from such mixtures by storage before centrifugal treatment, resulting in layer separation of the component parts is commercially objectionable as it requires very large storage facilities, becomes a nuisance on account of offensive odors and consumes long periods of time and considerable labor.

It is evident therefore that any method or means which will produce a practically continuous and automatic separation at one operation of the mixture and the removal of the component parts from each other will possess the greatest economic and commercial value.

In the process of my invention, I treat a constant flow of mixture in particularly constructed centrifugal devices, whereby there is a constant deposition of solids and a continuous specific gravity separation of the grease and liquid solutions from the mixture and from each other.

In a broad way, my invention consists in introducing the mixture into a rapidly revolving basket, or cage, having imperforate side walls, whereby the solids are deposited upon the bottom and side walls, and the remaining portion, or liquid portion, of the mixture is caused to form a plurality of upwardly moving vertical layers of different specific gravities produced by the action of the centrifugal force upon the mixture. The devices employed by me in the following of my process have incorporated therein certain elements, or means, whereby these various layers may be separated from each other and in this separated condition removed from the device for purposes of separate treatment as desired.

It will thus be seen that by my process and devices a stream of the mixture will be separated into its specific gravity components, the operation being continuous except when the accumulation of solids is such as to require removal from the device.

It is evident from my specification and accompanying drawings that my invention has wide application and can be efficiently employed with any mixture capable of separation into a plurality of different specific gravity components by means of centrifugal movement or force.

In the accompanying drawings illustrating modifications of the device of my invention suitable for the carrying out of the process of my invention, similar parts are designated by similar numerals.

Figure 1:
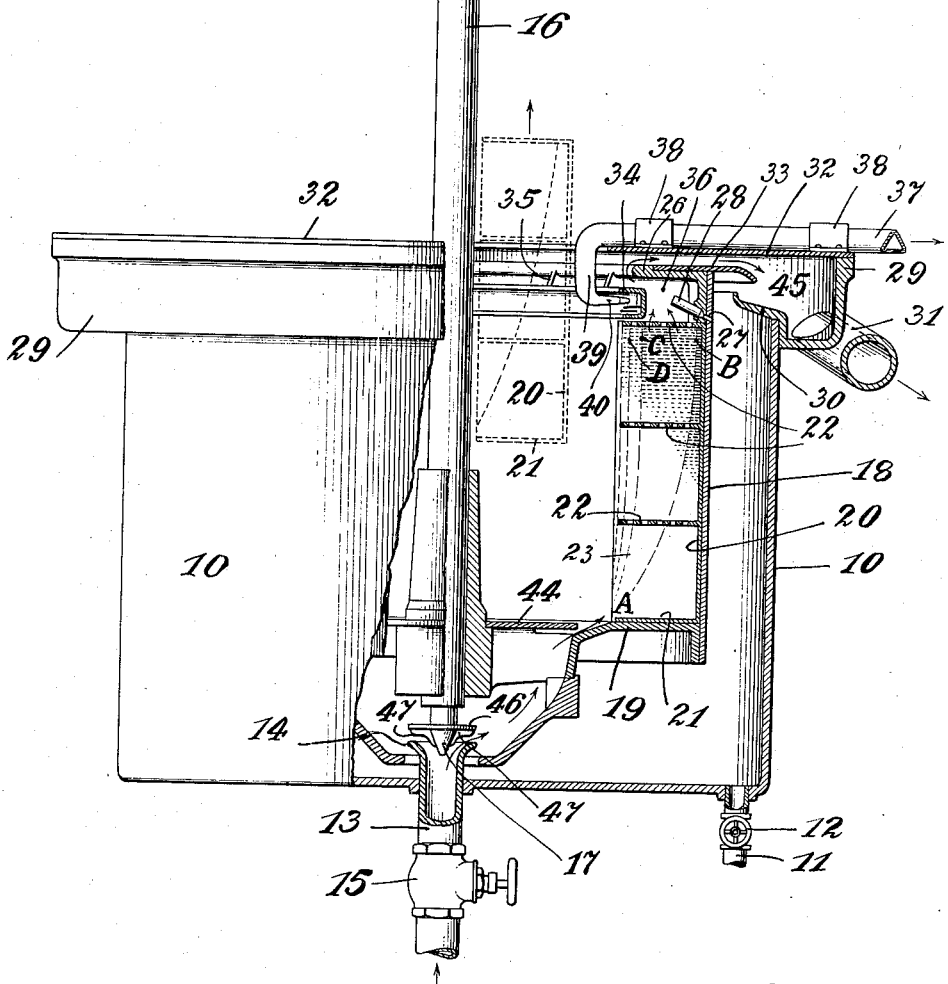
Figure 1 is an elevation of one form of my device, partly in section, for purposes of clearness of description.

The particular form of the device of my invention shown in the accompanying drawings comprises an annular container or curb 10, carrying the drip pipe 11 having the valve 12 and the feed pipe 13 with its outwardly extended annular lip 14 and the valve 15.

Centrally and vertically positioned within the curb 10 is the revoluble shaft 16, its lower end 17 carrying a disc 46 with the radial vanes 47, 47. The shaft 16 carries the imperforate basket 18, which is revoluble therewith.

The bottom basket portion 19 provides support for a plurality of removable residual collectors having the imperforate back 20, the imperforate bottom 21 and the horizontal foraminous partitions 22, 22, 22, each residual collector having a radial vertical side wall 23. The backs 20, 20 abut upon the cage wall 18 and the side walls 23, 23 are so arranged that when the plurality of collectors are in place there will be a side wall 23 between each collector.

Figure 2:
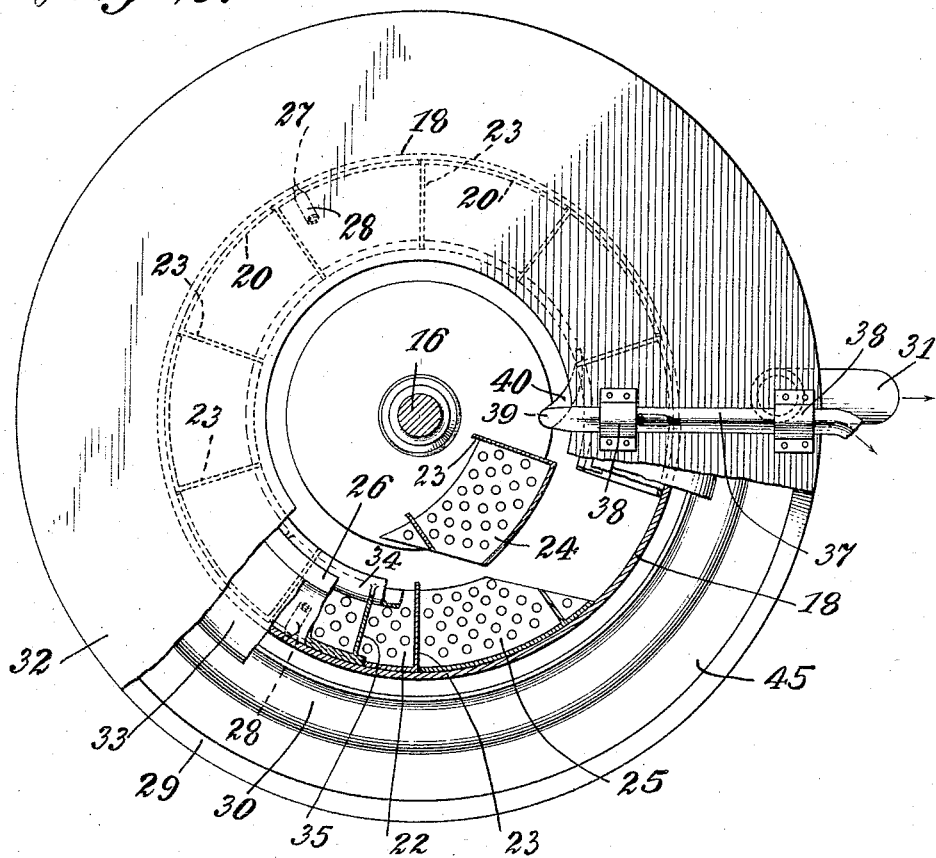
Figure 2 is a plan view of Figure 1, partly in section, for purposes of clearness of description.
Figure 3:
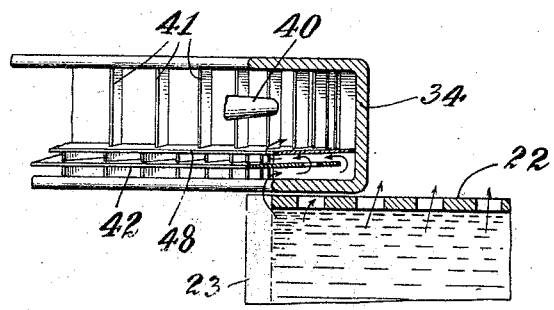
Figure 3 is an enlarged vertical cross-section of a portion of my device for the collection of liquids of lighter specific gravity.

In order that these residual collectors may be moved horizontally and inwardly in order to remove them from the container or curb 10 for purposes of emptying two of the collectors 24 and 25 are formed as shown in Figure 2. The collector 24 is capable of horizontal removal and this acts as a key, its removal serving to release the other collectors and allows of their horizontal movement.

An annular angle member 26 is fixedly attached to the inner face of the wall 18, and an opening 27 through the members 26 and 18 is capable of being closed by the removable plugs 28. There is a series of these holes and plugs.

An annular member 29 having an inwardly extended lip 30 is fixedly attached to the upper portion of the wall of the stationary container or curb 10. An overflow pipe 31 passes through the member 29.

An annular top plate 32, having a central opening, is carried by the member 29.

An annular plate 33, having its outer portion slightly inclined downwardly, is carried by the member 26.

An annular U-shaped member 34, having a central opening, is carried by the member 26 by means of the arm supports 35, 35.

There is thus formed an annular liquid collecting chamber 36.

Carried by the top plate 32 is a skimming pipe 37, horizontally movable within the supporting straps 38, 38, the interior portion of the pipe 37 being bent downwardly 39, then angularly inwardly 40, the extremity having an opening therein positioned within the chamber formed by the U-shaped member 34.

The U-shaped member carries a plurality of radially positioned baffle plates 41, 41, and a horizontal foraminous plate 42, above which is plate 48.

The shaft 16 is motor-driven at 43 and carries an annular deflecting plate 44.

The operation of the device is as follows:—

Assuming the residual collectors in place, the valve 12 is closed and the cage given a revoluble movement by means of the shaft 16. The valve 15 is then opened admitting the liquid to be treated. The liquid passes upwardly through the pipe 13, the space between the end 17, disc 46 with radial vanes 47 and the receiving chamber and is directed outwardly by the deflector 44. The centrifugal force imparted to the liquid by the revolution of the basket causes a separation of the several liquid ingredients into their respective specific gravity portions.

Assuming, for example, that the liquid mixture being treated consists of solids, water solution and grease, as might be the case if the liquid mixture were the results of say soap and alkali wool washing liquor, the solids because of their greater specific gravity will be driven against the backs 20, 20 of the plurality of residual collectors, the greater horizontal depth at the lower part thereof. As a result, there will be a gradually increasing accumulation of solids in a somewhat pyramidal form as indicated in the outer dot-and-dash line A—B of Figure 1.

The water solution, being intermediate in specific gravity between the solids and the grease, will pass upwardly between the dot-and-dash lines A—B and A—C, through the chamber 36, through the opening of the member 26, over the plate 33 into the chamber 45 and thence outwardly through the overflow pipe 31.

The grease and grease emulsion having the slightest specific gravity will pass upwardly between the dot-and-dash line A—C and A—D, through the upper plate 22, into the chamber formed by the U-shaped member 34, through and around the plate 42 and over the plate 48, through the opening of the pipe extremity 40 and thence through the pipe members 39 and 37.

By moving the pipe 37 horizontally the pipe member 40 may be positioned within the U-shaped chamber to effect the best grease separation and collection depending upon the composition of the liquid mixture.

It would seem from my experience that the foraminous plates 22, 22, 22 have a tendency to break up the grease emulsion into grease and liquid and to decrease the production of eddies and basket vibrations with consequent satisfactory operation and more complete separation of the mixture into layers. The baffle-plates 41, 41 have a similar effect upon eddy formation.

It is thus seen that there is a constant separation and collection of the solid materials, and an automatic separation and collection of the water solution and grease during the entire operation.

When it is necessary to remove the accumulated solid materials, the valve 15 is closed, the valve 12 is opened and the revolution of the device stopped. The liquid within the basket will then pass out through the pipe 11 and is retained for retreatment. If desired, the plug 28 may be removed and the cage revolved for a short time to remove further liquid from the solid materials.

The residual collector 24 is then moved inwardly and then upwardly, thus removing it from the device for purposes of removing the accumulation of solid materials. The other residual collectors are similarly removed for the same purpose.

Figure 4:
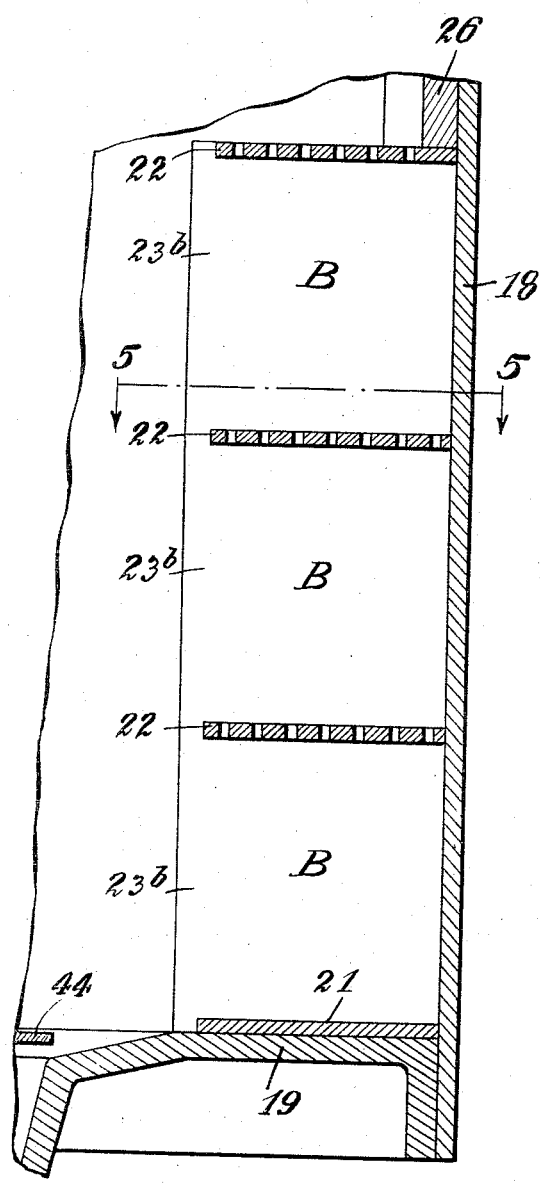
Figure 4 is a broken vertical section of a modified form of my residual collectors.
Figure 5:
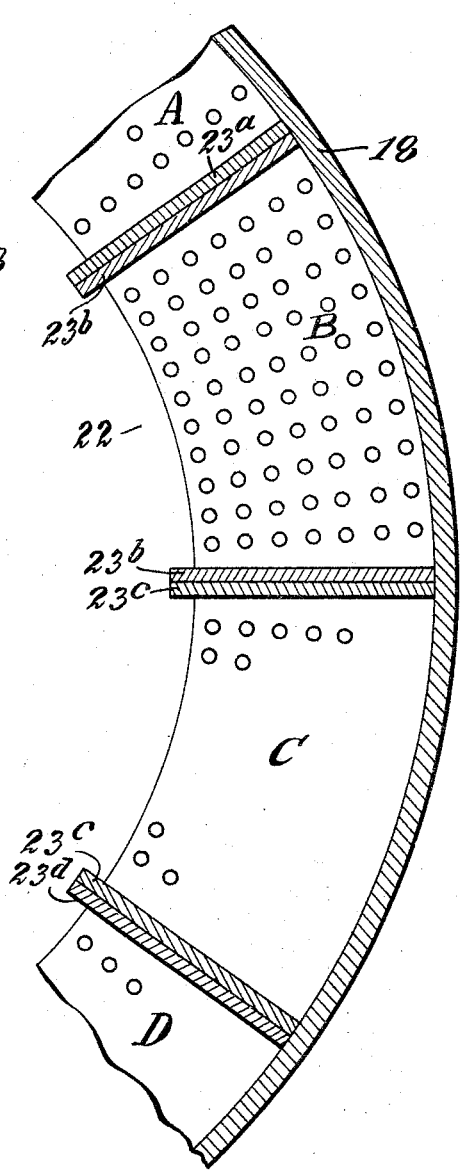
Figure 5 is a broken plan view of a device containing my modification, showing the arrangement of the modified residual collectors.

In Figures 4 and 5, I show a modification of the residual collectors in which the back member 20 of the described form has been eliminated with two radial vertical side walls 23$^{aa}$, $^{bb}$, $^{cc}$, &c. to each collector A—B—C, &c.

The advantage of this form of device is that when the collector is charged with solids and removed from the cage, the contents may be readily removed by forcing them inwardly or outwardly out of the collector, the outward movement being preferable because of the radial angle of the collector side.

In the employment of the modification, I find that it is sometimes advisable to first run through the device a liquid carrying a parting material which will pack in a thin layer up against the side 18 of the cage to prevent clinging (where sticky or clay-like residue material is involved) and form a parting surface on which will be deposited the solids in the liquid mixture to be treated. After having thus deposited the parting solid, I treat the liquid mixture as described above.

From a consideration of the accompanying drawings and the above description, it is evident that by the process and device of my invention, I am able to separate a liquid emulsion mixture, with or without solids, into its component specific gravity portions by means of centrifugal force and that such separation will be controllable, automatic and practically continuous, the necessity of interruption of operation being governed by the necessity of solid removal and I may use a modification of the above process and device to the degree required for simple separation of suspended solids from liquids.

I do not limit myself to the particular size, shape, number or arrangement of parts as shown and described, as these are given simply as an example for the clear description of my invention.

What I claim is:—

1. In a device for separating a mixture into specific gravity components, in combination, a stationary receptacle, a revoluble cage having imperforate sides within the stationary receptacle, means for revolving the cage, a plurality of removable collectors within the cage, means for introducing liquid mixtures into the lower portion of the cage during its revolution, liquid overflow means in the upper portion of the cage, an annular skimming ring carried within the cage positioned inwardly of the overflow means and a skimming member having an opening within the skimming ring, the skimming member extending outwardly of the cage.

2. In a device for separating a mixture into specific gravity components, in combination, a stationary receptacle, a revoluble cage having imperforate sides within the stationary receptacle, means for revolving the cage, a plurality of removable collectors within the cage, means for introducing liquid mixtures into the lower portion of the cage during its revolution, liquid overflow means in the upper portion of the cage, an annular U-shaped skimming ring carried within the cage positioned inwardly of the overflow means and a skimming pipe non-revoluble with the cage having an opening within the skimming ring, the skimming member extending outwardly of the cage.

3. In a device for separating a mixture into specific gravity components, in combination, a stationary receptacle, a revoluble cage having imperforate sides within the stationary receptacle, means for revolving the cage, means for introducing liquid mixtures into the lower portion of the cage during its revolution, a plurality of removable collectors within the cage, a plurality of horizontal foraminous plates within the collectors, liquid overflow means in the upper portion of the cage and means capable of liquid removal positioned in the cage inwardly of the overflow means.

4. In a device for separating a mixture into specific gravity components, in combination, a stationary receptacle, a revoluble cage having imperforate sides within the stationary receptacle, means for revolving the cage, means for introducing liquid mixtures into the lower portion of the cage during its revolution, a plurality of horizontal foraminous plates within the cage, liquid overflow means in the upper portion of the cage and means capable of liquid removal positioned in the cage inwardly of the overflow means.

5. In a device for separating a mixture into specific gravity components, in combination, a stationary receptacle, a revoluble cage having imperforate sides within the stationary receptacle, means for revolving the cage, means for introducing liquid mixtures into the lower portion of the cage during its revolution, a plurality of horizontal foraminous plates within the cage, liquid overflow means in the upper portion of the cage, an annular skimming ring carried within the cage positioned inwardly of the overflow means and a skimming member having an opening within the skimming ring, the skimming member extending outwardly of the cage.

6. In a device for separating a mixture into specific gravity components, in combination, a stationary receptacle, a revoluble cage having imperforate sides within the stationary receptacle, means for revolving the cage, means for introducing liquid mixtures into the lower portion of the cage during its revolution, a plurality of removable collectors within the cage, a plurality of horizontal foraminous plates within the collectors, liquid overflow means in the upper portion of the cage, an annular U-shaped skimming ring carried within the cage positioned inwardly of the overflow means and a skimming pipe non-revoluble with the cage having an opening within the skimming ring, the skimming member extending outwardly of the cage.

7. In a device for separating a mixture into specific gravity components, in combination, a stationary receptacle, a revoluble cage having imperforate sides within the stationary receptacle, means for revolving the cage, means for introducing liquid mixtures into the lower portion of the cage during its revolution, a plurality of removable collectors having foraminous sides within the cage, a plurality of horizontal foraminous plates within the collectors, liquid overflow means in the upper portion of the cage, an annular U-shaped skimming ring carried within the cage positioned inwardly of the overflow means and a skimming pipe non-revoluble with the cage having an opening within the skimming ring, the skimming member extending outwardly of the cage.

8. In a device for separating a mixture into specific gravity components, in combination, a stationary receptacle, a revoluble cage having imperforate sides within the stationary receptacle, means for revolving the cage, a plurality of removable collectors having foraminous sides within the cage, means for introducing liquid mixtures into the lower portion of the cage during its revolution, liquid overflow means in the upper portion of the cage, an annular U-shaped skimming ring carried within the cage positioned inwardly of the overflow means, a plurality of radially disposed baffle plates within the skimming ring and a skimming pipe non-revoluble with the cage having an opening within the skimming ring, the skimming member extending outwardly of the cage.

9. In a device for separating a mixture into specific gravity components, in combination, a stationary receptacle, a revoluble cage having imperforate sides within the stationary receptacle, means for revolving the cage, means for introducing liquid mixtures into the lower portion of the cage during its revolution, liquid overflow means in the upper portion of the cage, an annular U-shaped skimming ring carried within the cage positioned inwardly of the overflow means, a plurality of radially disposed baffle plates within the skimming ring, a skimming pipe non-revoluble with the cage having an opening within the skimming ring, the skimming member extending outwardly of the cage and closable means for connecting the upper portion of the cage with the stationary receptacle.

10. In a device for separating a mixture into specific gravity components, in combination, a revoluble cage having imperforate sides, means for revolving the cage, a plurality of removable collectors having foraminous sides within the cage, an annular skimming ring positioned within the upper portion of the cage and a pipe having an opening therein within the skimming ring, the pipe extending outwardly of the cage and being non-revoluble therewith.

11. In a device for separating a mixture into specific gravity components, in combination, a revoluble cage having imperforate sides, means for revolving the cage, a plurality of removable collectors having foraminous sides within the cage, an annular skimming ring having its closed side toward the cage walls and spaced therefrom in the upper portion of the cage and a pipe having an opening within the skimming ring, the pipe extending outwardly of the cage and being non-revoluble therewith.

Signed at South Barre in the county of Worcester and State of Massachusetts this 4th day of April, 1923.

JOHN L. TUFTS.